US006688519B2

(12) United States Patent
Vuong et al.

(10) Patent No.: US 6,688,519 B2
(45) Date of Patent: Feb. 10, 2004

(54) PROXIMITY CARD PRINTER AND ENCODER SYSTEM

(75) Inventors: Binh Thanh Vuong, Simi Valley, CA (US); Vinh Thanh Vuong, Simi Valley, CA (US); Liem Thanh Vuong, Simi Valley, CA (US); Son Thanh Vuong, Vancouver (CA)

(73) Assignee: VT Tech Corp., Simi Valley, CA (US)

( * ) Notice: Subject to any disclaimer, the term of this patent is extended or adjusted under 35 U.S.C. 154(b) by 0 days.

(21) Appl. No.: 09/940,187

(22) Filed: Aug. 27, 2001

(65) Prior Publication Data

US 2002/0101498 A1 Aug. 1, 2002

Related U.S. Application Data

(60) Provisional application No. 60/228,606, filed on Aug. 28, 2000.

(51) Int. Cl.[7] .................................................. G06K 7/00

(52) U.S. Cl. ....................... 235/436; 235/449; 235/451; 235/380

(58) Field of Search ................................ 235/436, 449, 235/451, 380, 382, 384, 381; 710/5–7; 714/42, 43, 48

(56) References Cited

U.S. PATENT DOCUMENTS

| | | | | |
|---|---|---|---|---|
| 4,827,425 A | * | 5/1989 | Linden | 700/225 |
| 4,855,583 A | * | 8/1989 | Fraser et al. | 235/492 |
| 5,229,586 A | * | 7/1993 | Ishii | 235/375 |
| 5,423,619 A | * | 6/1995 | Kohno | 400/525 |
| 6,367,701 B1 | * | 4/2002 | Fries | 235/486 |
| 6,394,346 B1 | * | 5/2002 | Bonneau et al. | 235/438 |
| 6,508,399 B2 | * | 1/2003 | Sasaki et al. | 235/381 |
| 6,512,594 B1 | * | 1/2003 | Lenz et al. | 358/1.16 |

* cited by examiner

*Primary Examiner*—Diane I. Lee
*Assistant Examiner*—Steven S. Paik
(74) *Attorney, Agent, or Firm*—Craig E. Shinners

(57) ABSTRACT

The present invention relates to an improved system and method for capturing information, storing images and for encoding and printing a plurality of proximity devices. The system comprises a printer/encoder platform a card reservoir, a print station, an encoder station, a reject bin, an output bin and a transport mechanism. The present invention further provides a database for storing printable and encoded data together with administrative functions. A printer/encoder program manages operation of the database and the printer/encoder platform.

15 Claims, 5 Drawing Sheets

PROXIMITY CARD PRINTER AND ENCODER SYSTEM

CROSS-REFERENCES TO RELATED APPLICATIONS

This application claims priority from co-pending U.S. Provisional Patent Application Ser. No. 60/228,606, filed Aug. 28, 2000 entitled “PROXIMITY CARD PRINTER AND ENCODER SYSTEM”, the disclosure of which is incorporated herein by reference in its entirety for all purposes.

BACKGROUND OF THE INVENTION (1) Field of the Invention

The present invention relates to a printer and encoder system and more particularly a system that includes a dye sublimation printer for printing plastic proximity cards and an encoder that programs said cards.

(2)

Proximity cards are well known in the art. Typically, proximity cards comprise a pair of sheets of plastics that laminated together to form a wallet-sized card. An antenna and a semiconductor embedded circuit are sandwiched in between the plastic sheets. When the embedded circuit is positioned proximate to a radio frequency transmitter, the embedded circuit is activated and broadcasts encoded information stored by the embedded circuit. In other embodiments, the antenna and the embedded circuit are encapsulated in a tag that may be readily attached to a key-chain, by way of example. Unless other necessary for the sake of clarity, the phrase “proximity device” will be used hereafter to refer to both the proximity card, the proximity tag or other forms of encapsulating an antenna and semiconductor detector circuit.

Proximity devices are widely used in a variety of applications such as to control access to commercial facilities. In this type of application, a user positions the proximity device proximate to a detector circuit. If the user is authorized to gain access, the detector circuit actuates a door lock mechanism. If the user is not authorized, the detector circuit will deny access.

It is customary in most business applications to provide each employee with his or her own proximity card. In such cases, the card may also be used to identify the employee by printing or affixing a picture of the employee, their name and other identifying information on one or both of the card’s surfaces. Unfortunately, in the past, the proximity devices are pre-encoded which means that an inventory of unprinted but encoded proximity devices must be carefully maintained. Maintaining a supply of cards is an expensive and lost proximity devices represent a security risk. In other instances, the proximity device is encoded after the card is printed. This lessens the risk of losing pre-encoded proximity devices but it requires two separate pieces of equipment, specifically, an encoder and a printer.

Encoding a proximity device occurs by programming the embedded circuitry so that it includes the identifying electronic information. After encoding, the electronic information is stored until the proximity card is positioned proximate to a detector circuit. At that time, the electronic information is passed to the detector circuit so that a determination can be made as to whether the user is authorized to proceed.

The process of collecting the employee information is also an involved activity that requires information to be collected from a variety of sources. For example, a photograph is often taken of each employee using a digital camera or a camera that uses film that does not require processing, such as is available from the Polaroid Corporation. This photograph is combined with employee data, such as the employee’s name, department number, title, date of hire, etc., on the front face of the proximity card for identifying the employee to other employees or security personnel. Typically, a dye sublimation printer that provides a color output is used to print the employee data and the picture on the proximity card. Several commercial programs are available for managing the employee data and controlling the operation of the printer. In operation, these programs enable a system administrator to either type the information into an entry field prior to printing or into a database so that the information may be subsequently accessed for printing. One such printer/encoder program, CARDMAN™, is available from VT TECH Corp., the assignee of the present invention.

Once the data is collected and printed, the proximity card must be verified for correctness. If the information is correctly printed onto the proximity card (that is, the correct photograph is combined with the proper employee data), the proximity card is physically transferred to a separate programming port where it is encoded with the electronic information. Often times, the process of printing the proximity cards is a batch process where many cards are printed in a single session.

Clearly, it is important for the encoded electronic information to be correctly matched with the printed information because an error could result in one or more proximity cards being encoded with incorrect information. When multiple cards are being printed, the task of maintaining the correct sequence of cards demands the care and attention of the operator. Maintaining the correct sequence is particularly important when the employer wishes to grant access to selected employees for a particular area while preventing access to other employees and non-employees. However, where a plurality of cards is printed and then encoded as a separate step in the process, it is a non-trivial task to ensure that the printed information is correctly matched with the electronic information when the printing process is separate from the encoding process.

Another problem associated with programming proximity cards arises in the context of two typical scenarios. One typical scenario arises when the proximity card has been properly printed but the card itself is defective. If the printed card includes a defective embedded proximity card circuit, it will have to be rejected. When a card is rejected, the whole process must be repeated. For small volumes of replacement cards, managing the process is relatively straightforward. However, as the number of replacement cards to be printed and programmed increases, the management task becomes much more complex because of the difficulty in matching the printed card with the correct electronic information. The second scenario arises when the proximity card is functioning properly but programmed information does not correlate with the printed employee data on the face of the card. It may, at times, be difficult to verify that the electronic information matches the printed card. Indeed, in many applications, the proximity card is pre-programmed and then stored until needed for a particular employee. Clearly, an employer must order an excess number of cards that must be held in inventory until needed for use. Unfortunately, this inventory of encoded but un-printed cards creates a security risk if one or more cards are subsequently found to be missing. Alternatively, small numbers of cards can be ordered (at a significantly higher cost) each and every time a new card must be printed but the delay between ordering the encoded card and its receipt may be significant and thus unacceptable for many applications. Indeed the lead-time for receiving an order of encoded proximity cards can be several weeks.

Yet another problem that arises from the present two-part system for printing and encoding proximity cards is the lack of sophisticated software that enables a non-technical user to readily print and encode proximity devices. Indeed, it is common to use low-level software to encode the electronic information because the encoding process requires low-level bit and bytes definitions to be defined and programmed. As such, the current software is not well suited for use by any but skilled programmers. Indeed, in most applications where a facility code must be managed, commercially available software is unable to provide such capability.

Accordingly, what is needed is a system that provides a means for both printing the face of a proximity card as well as programming the embedded proximity card circuit in a single operation and that includes user friendly software for controlling and managing the process.

SUMMARY OF THE INVENTION

The present invention relates to an electronic proximity device-on-demand system and method. More particularly, the present invention relates to an improved system and method for capturing information, storing images and for encoding and printing a plurality of proximity devices in an efficient manner.

The system comprises a printer/encoder platform that includes a proximity card reservoir, a print station, an encoder station, a reject bin, an output bin and a transport mechanism. The print station is preferably a dye sublimation printer that accepts a wallet-sized plastic card at an input port, transports the card to an encoding station where electronic information is encoded and thereafter transports the card to a printing station where information corresponding to the encoded information is printed. The encoder station comprises encoder circuitry for encoding proximity devices. Encoded and printable information is preferably provided by a computer system coupled to the platform. Rather than print a plurality of cards in first sequence and then encode the plurality of cards in a second sequence, the present invention encodes the electronic information in a first step, verifies the correctness of the encoded information in a second step and then prints the printable information in a third step without intervention by a system administrator. By programming the proximity device before the printing process, defective proximity devices will not bear printed information thereby limiting the security risk if lost, stolen or misplaced. Indeed, if either the proximity or print step results in an error, the present invention enables the system administrator to enact timely corrective measures. Thus, the error can be resolved or a reprogram operation selected so that a replacement card is immediately encoded and printed and the database updated to reflect the error. Reject cards are collected for destruction by the platform. There is no need to attempt to manually ascertain or maintain verify correlation between printable data and the encoded electronic information. Performing an initial verification that the proximity device includes an expected encoded unique signature further enhances security. If the signature is not detected, the system terminates all programming or printing functions until the proper signature is provided.

The present invention further provides a database printer/encoder program for storing printable data together with authorization levels for use in programming the electronic information. Management functions enable the system administrator to create and maintain various accounts and user access rights for modifying the database. These management functions are implemented on a computer system coupled to a network such as an intranet or the Internet. The management functions further include a report generator.

The database printer/encoder program comprises an printer/encoder program interface (API) that couples a database engine with an application engine. The API couples the components of the printer/encoder program to the platform and provides an interface for third party software to access the printer station, the encoder station as well as the database. The API couples the platform to the database printer/encoder program and is responsible for controlling the operation of the print station and the encoder station and the transfer of printable and encoded information to the printer.

The print station provides status control information to the application engine so that the printer/encoder program can monitor operation of the printer. The printer also provides an indication when a card arrives at the print station or when it is moved to a bin.

The printer/encoder program provides control instructions to the platform so that a card is moved by the transport mechanism to a selected station and then instructs either the printer or the encoder to perform a requested function such as print or encode, respectively. If an error is reported at either station, the printer/encoder program provides control instructions to transport the card to a reject bin. If the card is correctly programmed, the printer/encoder program provides control instructions to transport the card to the output bin. Once a previous card is binned, the printer/encoder program instructs the platform to select the next card from the reservoir. Since the database printer/encoder program is tightly coupled to the platform, management of security information is improved and improperly encoded or printed cards are readily controlled.

These and other advantages of the present invention are more clearly described in the following detailed description of a preferred embodiment.

DETAILED DESCRIPTION OF A PREFERRED EMBODIMENT

Figure 1:
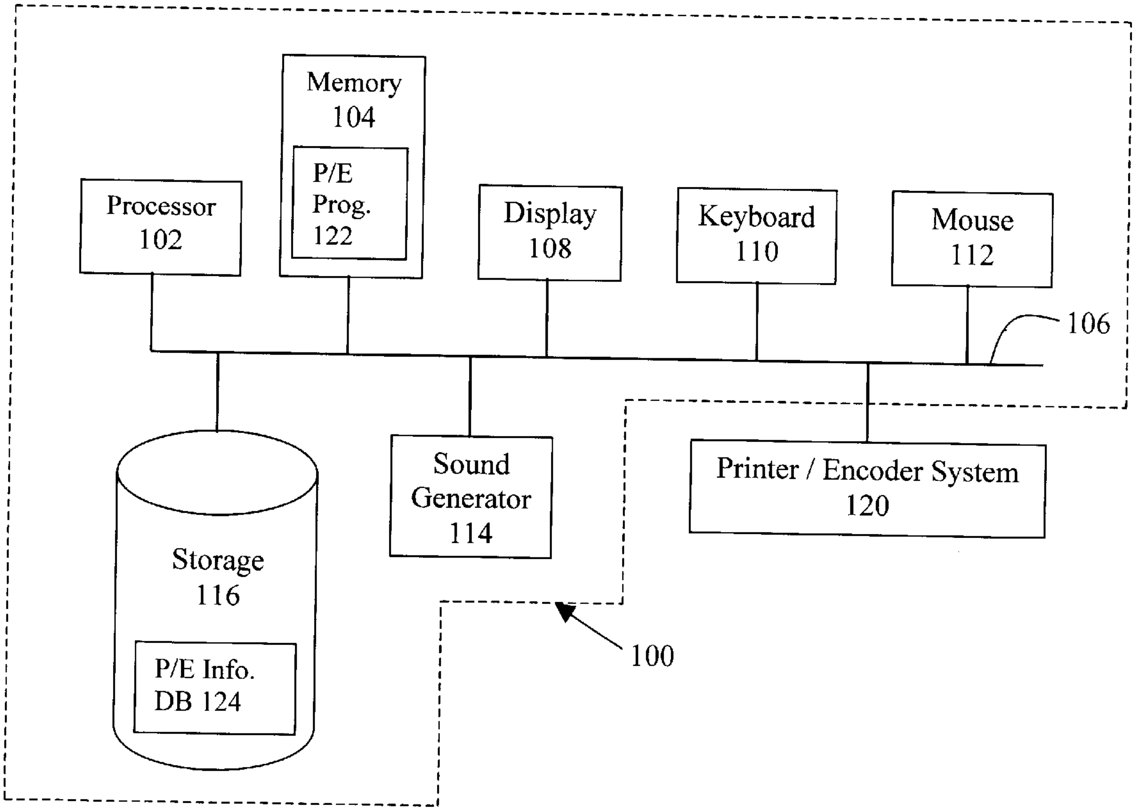
FIG. 1 shows a block diagram of one embodiment of a system for printing and encoding proximity cards.

The present invention relates to a system for printing and encoding proximity cards. More particularly, the present invention relates to an improved management system for storing information to be printed on the exterior of proximity cards and the encoded information associated with each of the printed cards. The present system improves the efficiency of printing and encoding proximity cards by bundling these separate processes. In the following description of the preferred embodiment, reference is made to the accompanying drawings that form a part hereof, and in which is shown by way of illustration a specific embodiment in which the invention may be practiced. It is to be understood that other embodiments may be utilized and that changes may be made without departing from the scope of the present invention. For purposes of illustration the following description describes the present invention as used with a particular operating system on a personal computer. However, it is contemplated that the present invention can be used as a part of a computer system that operates in conjunction with other operating systems. Further, although the present invention is also described in conjunction with a particular dye sublimation printer, it is contemplated that principles of the present invention are not limited to the described printer.

Reference will now be made in detail to the preferred embodiments of the invention, examples of which are illustrated in the accompanying drawings. Wherever possible, the same reference numbers will be used throughout in the drawings to refer to the same or like components.

FIG. 1 illustrates the hardware components of an exemplary computer-based system 100 for practicing the invention. System 100 includes at least one microprocessor 102 and random access memory 104 coupled by system bus 106 to a plurality of peripheral devices that may include a display terminal 108, a keyboard 110 and/or a mouse 112, a sound generating device 114 and a secondary storage device such as a magnetic disk drive 116. As one skilled in the art will appreciate, additional devices may be included as a part of computer system 100 although not specifically shown in FIG. 1 for the sake of clarity. As will be appreciated by persons of ordinary skills in the art, the exemplary computer system and the functions performed thereby are not critical to the use of the present invention and that other arrangements of devices may be substituted therefor.

Computer system 100 further includes a printer encoder platform 120. Printer encoder platform 120 includes a commercially available dye sublimation printer such as is commercially available from Zebra Technologies Corp. Such printers are adapted to print a variety of plastic card types, the most common of which is known in the art as an ID card, where "ID" is shorthand notation for identification. As is also well known in the art, the ID card may include a magnetic strip so that printed information appears on one side and encoded data is encoded on the magnetic strip on the reverse side. The encoding of the magnetic stripe is a separate operation. In addition to ID cards, this type of printer may also print proximity cards, although prior art printers are not able to encode the embedded chip.

Computer system 100 further includes a printer/encoder program 122 is stored on the secondary storage device and, upon request, is transferred to memory 104 of computer 100 when a card is to be printed. As illustrated in FIG. 1, printer/encoder program 122 is resident in memory 104 while printable and encoded data in a database 124 maintained primarily on storage device 118. The printer/encoder program is operatively coupled to the printer encoder platform 120 by bus 106. One preferred embodiment of the present invention allows a user of computer system 100 to store and access printable information from printer/encoder program 122 for printing on proximity cards. Printable information may include, by way of example, employee information such as a digitized photograph, name, department number etc. The phrase printable information may include information that is not printed but that is otherwise associated with the printable information in the database. It is to be understood that printable information will depend on the intended application of the proximity card and will be specified by the administrator. This information may be input by the administrator or acquired via a network connection. Advantageously, the administrator may view the printable information prior to printing and encoding the proximity card on display 108 and enter corrections using keyboard 110 and mouse 112.

Printer/encoder program 122 also associates electronic information with the printable information for encoding on the proximity card. The electronic information is also stored in database 124. However, to further increase security, the electronic information to be encoded onto the proximity circuit need not be maintained in a single database but may be distributed among two or more databases with restrictions place on user access.

In operation, database printer/encoder program 122 operates under the Windows operating system environment available from Microsoft Corporation. Printer encoder program 122 provides security log-in features to control access to database 124, auto-incrementing of a reference number between the printing and encoding of each proximity card and management of assigned "User IDs," which are numbers associated with each proximity card by printer/encoder program 122. The system administrator may operate system 100 in either a single card mode or in a batch mode of operation.

In the batch mode of operation, the database printer/encoder program encodes, prints and verifies the results before releasing the card to an output bin. If one or more proximity cards are not properly encoded, the cards are automatically routed to a reject bin and a report displayed on display 108 and in a log file stored on storage device 116. Rather than individually print and encode each card using a printer and an encoder, the system administrator may monitor batch operation without tracking whether one or more of a plurality of cards was properly programmed before beginning the encoding and printing of the next card.

Printer/encoder program 122 further includes an API dynamic loadable module (not illustrated) to facilitate integration with third party software programs to provide unique functional features in addition to the above-described features.

Figure 2:
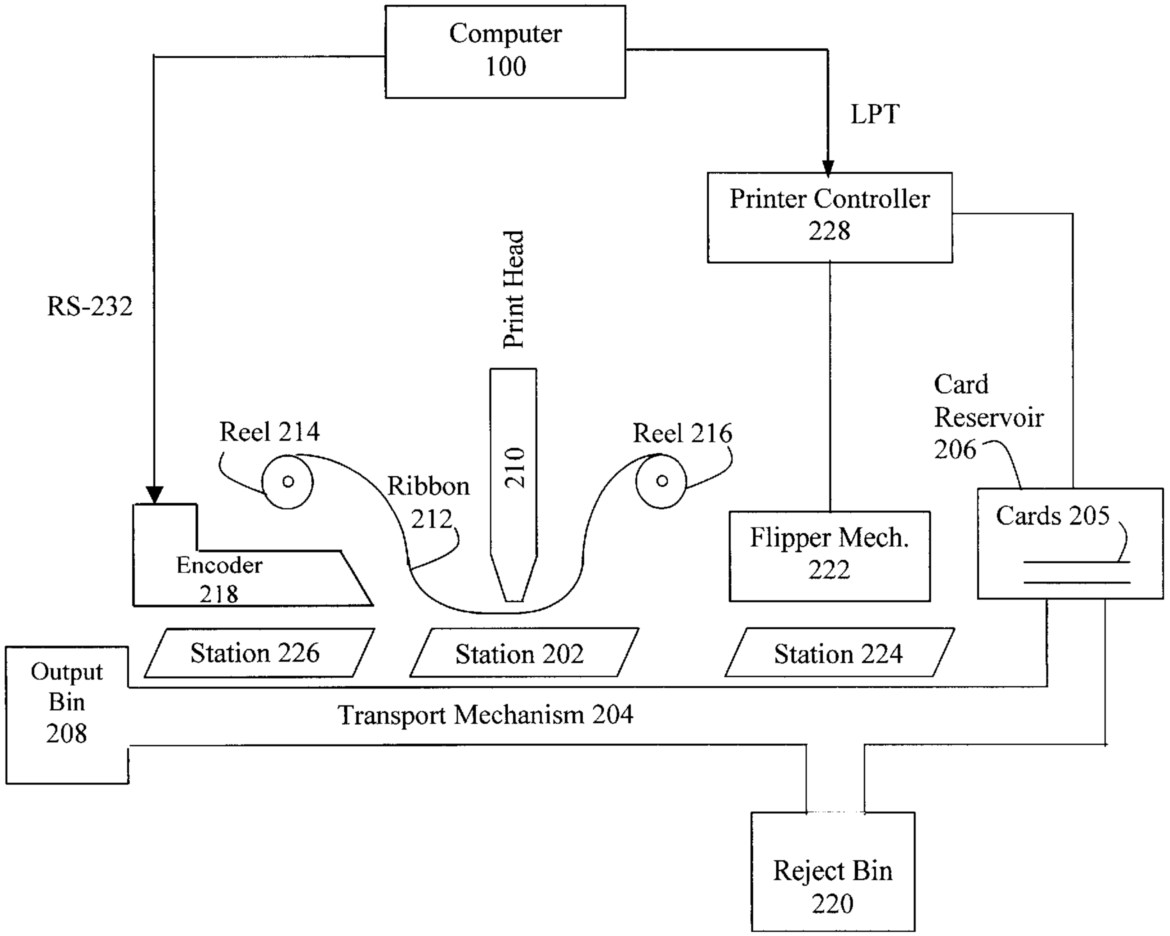
FIG. 2 illustrates a printer/encoder system for encoding and printing proximity devices.

FIG. 2 further illustrates schematic representation of one preferred embodiment of system 100 and in particular printer/encoder system 120. Printer/encoder system 120 includes a print station 202 and transport mechanism 204. Upon receipt of a command from computer system 100, transport mechanism 204 moves one of a plurality of proximity cards 205 from a reservoir 206 to print station 202. When one of the cards 205 is positioned at station 202, printer/encoder program 122 provides printable information for printing. Once the printing process is complete, transport mechanism 204 may move cards 205 from the print station 202 to an output bin 208 where the cards are collected.

Associated with print station 202 are a print head 210 and a ribbon 212 maintained on a pair of reels 214 and 216. A length of ribbon 212 extending between reels 214 and 216 is positioned between print head 210 and print station 202. Upon the printer controller's receipt of a command to print from computer system 100, which is issued by way of the LPT printer port, print head 210 engages ribbon 212 and transfers printable information to card 205.

Transport mechanism 204 defines a transport path that extends from reservoir 206 to output bin 208 with printing station 202 being an intermediate position along the transport path. It includes a plurality of rollers and friction elements to control the movement of cards from one station to anther. Typically, the rollers and elements are made of metal or other conductive elements. Additional stations are further defined along the transport path for collecting reject cards and for encoding. Preferably, transport mechanism 204 can position card 205 at station 224 where a flipper mechanism 222 selectively flips cards 205. One skilled in the art will recognize that a flipping mechanism changes the orientation of a card so that a face of the card facing upward, for example, is turned over or the leading edge of the card becomes the trailing edge. Computer system 100 interfaces with printer head 210, flipper mechanism 222 and transport mechanism 204 through printer controller 228.

To encode proximity cards, a programming module 218 is positioned proximate to the transport path. Programming module 218 obtains its power from the printer portion of the platform. Module 218 defines a programming station at which point transport mechanism 204 will position the proximity card upon receipt of the appropriate command. Upon completion of the encoding process, the proximity card may be transported to either the output bin 208 or the reject bin 220 under the control of the printer/encoder program 122.

Figure 3:
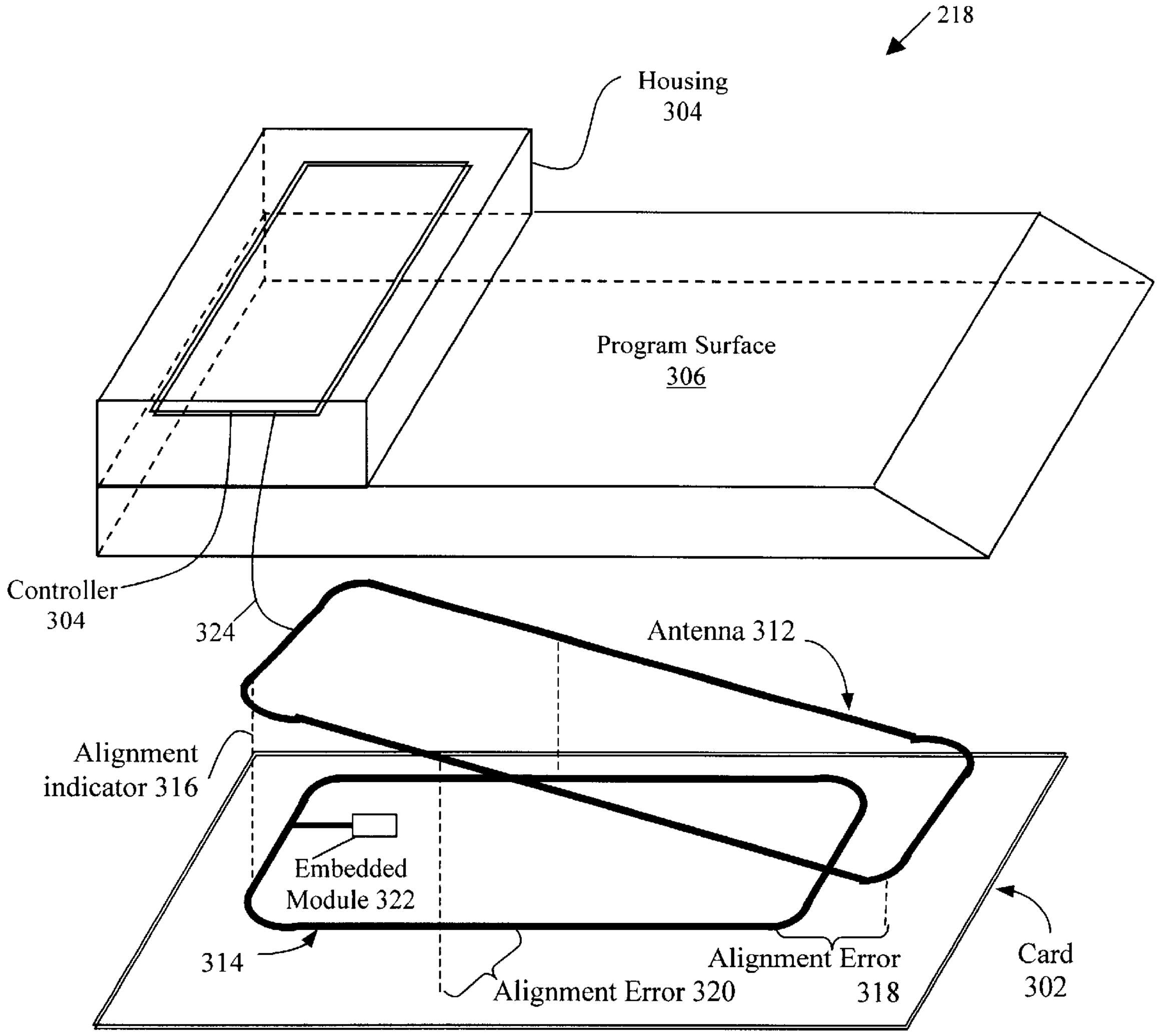
FIG. 3 is an exploded view of the encoder module of said printer/encoder system.

A partially exploded view of module 218 is illustrated in FIG. 3 together with a proximity card 302. Encoder modules are known in the art but have been previously used in context of a separate programming station where the alignment is manual. As such the commands associated with such prior art modules have been relatively simplistic, e.g., program and verify. Further, because the prior art encoders are stand-alone, the form factor is typically square in nature with a top surface being used to program a variety of proximity devices such as wallet sized cards and key tags. In contrast and in accordance with the present invention, module 218 comprises a housing 304 having a surface region 306 for programming proximity devices such as proximity cards or key tags and a cover 308 for retaining an encoder controller 310. Housing 304 also includes an antenna 312. Housing 304 of module 218 advantageously provides a top and a bottom encoding position. When housing 304 is positioned proximate to encoding position 226, proximity cards may be automatically positioned relative to antenna 312 for encoding using the bottom encoding position while key tags may be encoded using the top encoding position.

Module 218 is coupled to computer 100 to receive programming instructions and encoded information. The interface between module 218 and computer 100 is preferably an RS-232 interface or similar interface such as Universal Serial Bus (USB) or a small computer system interface (SCSI) port all of which are well known in the art and commercially available.

It is important that module 218 be positioned relative to the transport path such that when the proximity card is positioned by transport mechanism 204, a card antenna 314 in proximity card 302 is substantially aligned with antenna 312. This alignment is critical to ensure the successful transfer of information to the proximity card. However, because antenna 314 is not symmetrical with respect to the outer dimensions of the card 302, antenna 312 is offset from the transport path defined by transport mechanism. As used herein, offset denotes that antenna 312 is positioned such that it is not symmetrically aligned with the transport path defined by transport mechanism 204.

In addition to the offset alignment relative to the transport path, the card must also be positioned along the transport path so that its antenna 314 is aligned with respect to antenna 312. It is necessary to ensure that antenna 314 does not extend beyond both portions of antenna 312 that are perpendicular to the transport path. Alignment indicator 316 illustrates alignment of the perpendicular portions of antennas 312 and 314.

In the preferred embodiment, antenna 312 comprises a wire coil positioned in housing such that it is not in electrical contact with any metal or conductive portion of transport mechanism. Accordingly, antenna 312 may be canted relative to the transport path to enable any roller elements of transport mechanism to engage proximity card 205. Further, due to the distances involved and possible variation in orientation of antenna 314, antenna 312 has a larger radius that antenna 312. Alignment indicators 318 and 320 illustrate the typical alignment orientation that results from typical dimensions of antenna 314 and the distance between antennas 314 and 312 introduced by transport mechanism 204.

In addition to the offset alignment and alignment along the card path, module 218 must also introduce a slight angle or cant to antenna 308 to avoid elements of the transport path. Housing 304 must be plastic or other non-conducting material because a metal housing would act as a field reflector and would interfere with the encoding. Due to space constraints presented by the transport mechanism, housing 304 has a low profile such that a portion extends under the metal frame of the printer ribbon take-up reel 214 but over a metal roller (not shown) that is part of the transport mechanism. The two-level housing conforms to the printer form factor, eliminating the possibility of interference with the ribbon feed mechanism.

To position the antenna 312 as close as possible to card 302 during programming, antenna 312 is canted so that it is closer to card 302 at one end of antenna 312 and further away at the other end in one preferred embodiment. In this embodiment, one end of the antenna is about 1.9 cm above the card while the other end of the antenna is much less and is less than, in one embodiment, about 1.0 cm above the card. This alignment avoids mechanical interference with the transport mechanism. In another preferred embodiment, the antenna is positioned above any roller or other transport mechanism element and substantially parallel to the card. In this embodiment, the distance between the card and the antenna approaches a maximum programming distance. As a preferred maximum, antenna 312 should be maintained about 1.9 cm or less above the card to maximize efficiency of the programming and detection process.

Due to the inherent limitation of the transport mechanism 204, print/encoder program 122 will initiate a micro-adjust or dither to attempt to position the card for proper programming. Thus, if an initial attempt to program the card fails, the transport mechanism 204 is instructed to move the card forward for a fractional portion (for example, three percent) of the overall length of the card. The encoded information is then re-programmed. If the verification determines that the re-program failed again, the transport mechanism 204 is instructed to move the card back by a fractional portion (such as, six percent) and re-programming and verification process is repeated.

If the repositioning efforts fail to verify, the card is transferred to the flipper station 224 and re-orientated. After the card is transported back to the encoding station 226, the programming and verification attempted once again. If the dither process is unsuccessful, the card is rejected and transported to the reject bin 220.

Housing 304 includes the encoding controller, which is secured in housing 304 using epoxy potting techniques for security and reliability. Encoding controller must be positioned as close as possible to antenna 312 to minimize lead length and signal line loss. Minimizing the separation improves encoding yield. The lower profile portion of the housing contains the antenna. The lower profile portion of the housing may also include an indentation in the upper surface (not shown) so that a proximity key tag may be placed on top of the housing and programmed.

Printer/encoder program 122 sends commands to module 218 under control of processor 102. Module 218 is coupled to antenna 312 by a set of four wires 324. Two of the wires couple a modulating signal from controller 308 onto antenna 312. The modulated signal induces a programming signal that is detected by antenna 314 in the proximity card. The controller must compensate for lead length to ensure that the modulated signal is sufficient to encode the information. Since the encoding information is low-frequency (about 125 kHz), the controller is physically removed from the antenna so that the antenna may be positioned in a manner that minimizes adjacent conducting structure. To minimize interference, the programming information may be transmitted at a higher frequency but the antenna must be tuned based on the distance of separation. This is typically dependant on the particular printer platform and is readily determined on a case-by-case basis.

In practice, antenna 312 is over-layed by a sense antenna (not illustrated) to sense encoded information. The remaining two wires couple the sense antenna to controller 308. When the sense antenna senses encoded information, a differential signal containing the information is sent to controller 308 which in turn send the detected information to program 122 for verification. Additional devices (not shown) may access controller 308 through the API, which acts as the gateway for other functions.

Positioning of the proximity card at the encoding station is the responsibility of the printer controller associated with the print station. Positioning information is transmitted together with printable information and transmitted from the host to the print head 208 via a line printer cable.

Printer/encoder program includes a database feature for maintaining employee information. One skilled in the art will appreciate that the database may be adapted to applications other than for storing employee information. For example, the printer/encoder program may be used by a gasoline retailer to provide their customers with the features of a proximity card combined with credit information. In such applications, the database will contain account information for a plurality of consumers. Using system 100 and the database printer/encoder program, this information is then encoded in a proximity card and personalized information, such as each consumer's name and photograph, is printed on the card.

Figure 4:
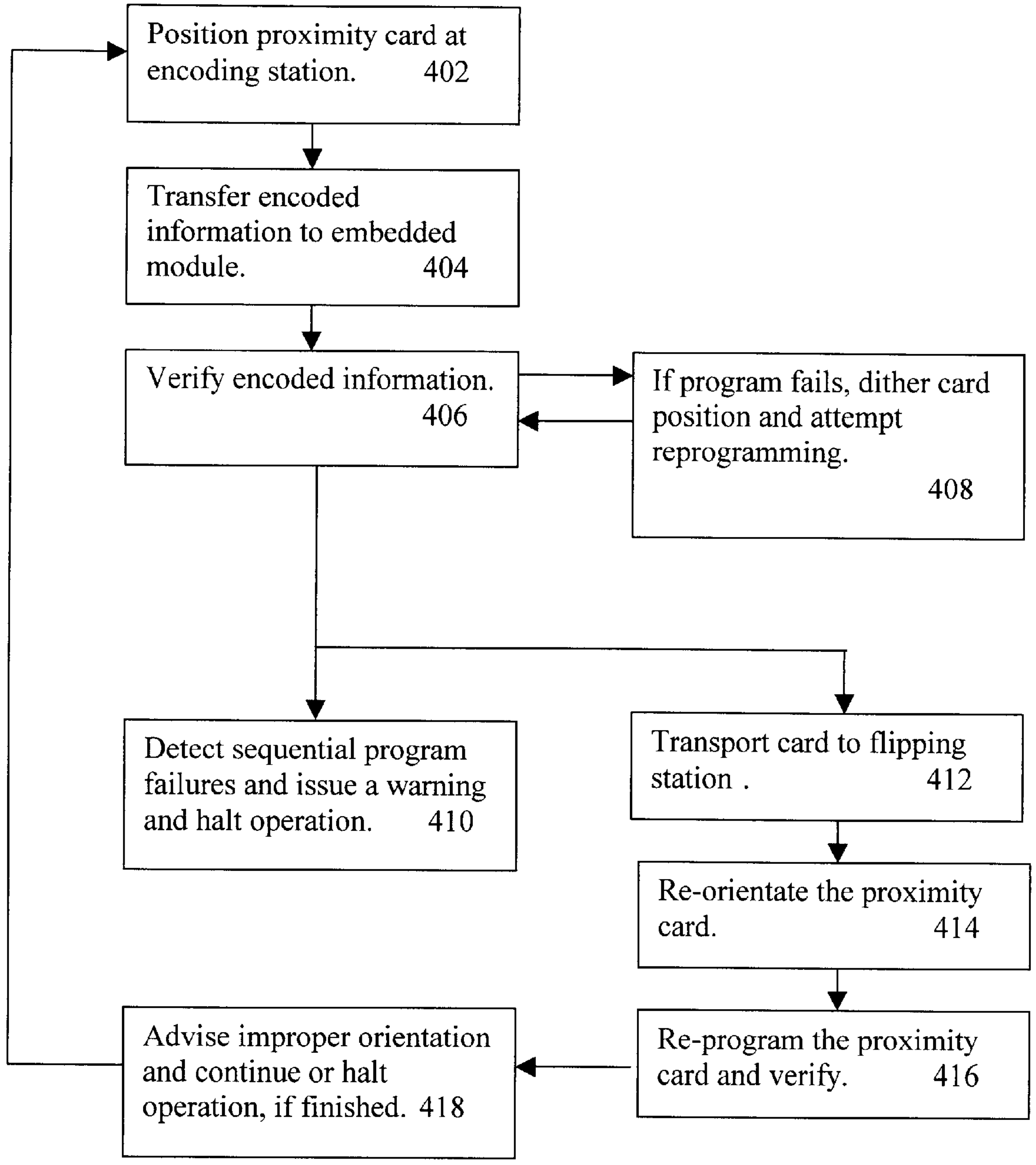
FIG. 4 illustrates a method for programming and printing proximity cards.

The encoding operation is illustrated in FIG. 4. Once proximity card 302 is positioned at encoding station 226, step 402, controller 308 accepts commands and encoding data for transfer to an embedded module 322 associated with card 302, step 404. The database printer/encoder program 122 includes a verify routine that ensures proper alignment of antennas 312 and 314. If card 302 has been incorrectly placed into reservoir 206, it may not be possible to align antennas 312 and 314. In such instance, module 218 will be unable to program and verify the embedded information and the card will be rejected, step 406. However, printer/encoder program 122 attempts to dither the position of the card along the transport path to better align antennas, step 408. If two sequential cards in a sequence of cards are rejected for failure to program correctly, a warning is issued on display device 108 and operation halted to enable an operator to determine the source of the problem, step 410.

Alternatively, if the printer includes a card flipper, the database printer/encoder program 122 includes software logic to instruct transport mechanism 204 to cycle the card to flipping station 224, step 412, flip or rotate the card, step 414, and attempt to re-program the card and verify the result, step 416. Clearly, it is desirable to minimize the necessity to "flip" on more than an occasional card so if two or more cards are successfully programmed after the flipping process, the software logic will generate an operator warning suggesting that the cards in the reservoir be checked for proper alignment in an attempt to improve the throughput rate. Process flow proceeds with programming the next card in the reservoir or terminates if all cards have been successfully programmed, step 418.

Referring again to FIG. 2, operation of system 100 proceeds in accordance with the following description. Specifically, a plurality of un-encoded blank proximity cards 205 is loaded into the reservoir 206. Cards are individually moved from the reservoir to the proximity programming station where it is programmed. If the card is to be printed, it is then moved to the print station where it is programmed. When both operations are complete, the card is moved to the output bin. If a card defect is detected during either the print or the encode process, the card is moved to the flipper and ejected into the reject bin. The basic process then continues for the remaining cards in the bin or until the printer/encoder program signals that no additional cards are to be programmed. If the cards in the reservoir are pre-printed, the card need only be moved to the programming station and programmed. After programming, the decision is made as to whether the programming was successful or not and the appropriate bin is determined.

The printer/encoder program incorporates a password before allowing access to system administrator functions. The password may be entered using either the keyboard or other input device (such as a biometric device) or by using a master-encoded proximity card (the "master card") containing the password as encoded information. When the system administrator uses the master card, the printer cover is opened and the master card is positioned on top of the housing. Then the sense antenna detects the encoded information and activates the printer/encoder program. In the embodiment with the canted sense antenna, the sensing process is improved because the portion of the antenna that lies above the transport mechanism roller is now closer to the master card. Clearly, it is possible to use module 218 to program additional master cards so that each administrator who is authorized to use the application printer/encoder program has his or her own card. Each of the cards can be individually programmed using this manual/single card programming method.

Using the master card, an audit trail is generated and stored in database 124. The audit trail tracks the number of proximity cards that were printed by each administrator as well as which cards were printed by which administrator. Before the administrator is authorized to manipulate system 100, the master card is read and an initial verification check is performed to verify that the proximity device includes an expected encoded unique signature. If the signature is not detected, the system terminates all programming or printing functions until the proper signature is provided. This unique signature can also be read on each proximity device prior to printing or encoding to verify that the cards in the reservoir are from a know supply and are not supplied surreptitiously.

The printer/encoder program initially collects database information. This information may be imported from other programs using the API or directly input in response to user prompts displayed on the display device. This collected information is available for third party management and status reports through the API.

The printer/encoder program supports the 26-bit Wiegand format although other formats are readily supported. The Wiegand format provides a one-byte facility code and a two-byte user ID. Thus, up to 10 facility codes may be supported by each system 100 and up to 64 k unique user IDs can be encoded. The database printer/encoder program provides an automatic user ID increment to eliminate the likelihood of duplicate numbers.

In operation, an administrator will log into the system, as described above, and will input the facility code. Typically, each building or other grouping structure is provided a unique number. The printer/encoder program accesses information stored in third party databases through the API. This third party database may include printer control software programs to control the printer and print out printable information. When third party software programs are run, the printer/encoder program generates the encoding information and control for positioning the card. Information from the third party software program may be captured and correlated with the encoded information. In this manner the printer/encoder program matches encoded information with the printed information. The database printer/encoder program further includes the control functions for programming multiple cards and for verifying the correct encoding of the facility and user ID numbers.

Figure 5:
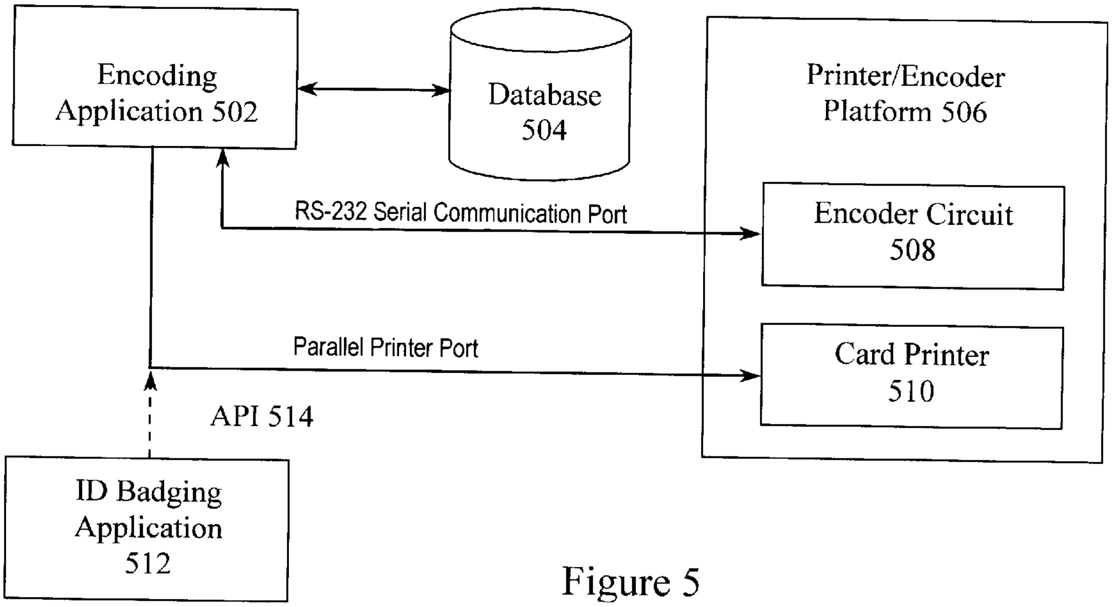
FIG. 5 shows an alternative embodiment of the printer/encoder system.

Referring now to FIG. 5, another preferred embodiment of the present invention is illustrated. In this embodiment, an encoding application program 502 is coupled to an informational database 504. Program 502 controls the operation of a printer encoder platform 506 in response to instructions associated with program 502. Platform 506 includes an encoder circuit 508 and a card printer 510. Program 502 and circuit 508 exchange control and information over a serial communication port, which in the illustrated embodiment is a RS-232 port. Program 502 controls card printer over a parallel printer port. Third party functions, such as ID badging functions, are provided over an application program interface (API). The interface enables these functions to access database 504 and to directly control the printer.

While certain exemplary preferred embodiments have been described and shown in the accompanying drawings, it is to be understood that such embodiments are merely illustrative of and not restrictive on the broad invention. Further, it is to be understood that this invention shall not be limited to the specific construction and arrangements shown and described since various modifications or changes may occur to those of ordinary skill in the art without departing from the spirit and scope of the invention as claimed.

We claim:

1. An assembly for printing and encoding proximity cards comprising:

a printer for printing cards, said printer having a print station, a reservoir for storing a plurality of cards and a transport mechanism for transporting one of said cards from said reservoir to said print station;

at least one proximity card initially positioned in said reservoir, said proximity card having an embedded circuit;

a housing having a region for positioning an antenna proximate to said transport mechanism and a controller for generating a signal for encoding or detecting said proximity device, said housing defining a first encoding and detecting station proximate to said transport mechanism and a second encoding and detecting station remote from said transport mechanism;

means for controlling operation of said transferring mechanism to position said proximity card at said first encoding and detecting station prior to encoding said proximity card; and means for transferring encoding signals to said antenna for encoding and detecting said proximity card at said first encoding and detecting station or a second proximity device at said second encoding and detecting station;

a computer for executing program instructions associated with said controlling means and said transferring means;

first bus means for coupling said computer to said printer;

second bus means for coupling said computer to said controller;

a database, associated with said computer, for maintaining printable and encoding information; and an application program interface (API) for importing functions operable on said printable and encoding information in said database from third party application programs.

2. The assembly for printing and encoding proximity cards of claim 1 further comprising:

means for detecting a failure to encode said proximity card; and a flipper mechanism for changing the orientation of said proximity card, said flipper mechanism coupled to said encoding station by said transport mechanism.

3. The assembly for printing and encoding proximity cards of claim 2 further comprising a reject bin for collecting proximity cards that are not properly encoded, said reject bin coupled to said encoding station by said transport mechanism.

4. The assembly for printing and encoding proximity cards of claim 1 wherein said housing is positioned above said transport mechanism.

5. The assembly for printing and encoding proximity cards of claim 1 further comprising means for creating an audit trail.

6. The housing of claim 1 wherein said antenna is aligned along a transport path defined by said transport means, said antenna offset from said transport path.

7. The housing of claim 1 wherein said antenna is aligned along a transport path and canted at an angle with respect to said transport path to minimize the distance between said proximity card and said antenna when said proximity card is positioned at said encoding and detecting station.

8. A method for selectively reading and encoding proximity cards during a printing operation on a computer based platform, said platform having a database for storing information, a reservoir for storing a plurality of proximity cards, a printer for printing information on said proximity cards and an encoder module for reading and encoding encoded information on said proximity cards, said printer and encoder module coupled to said reservoir by a transport path, said method comprising the steps of:

positioning one of said plurality of proximity cards at an encoding and reading station proximate to said encoder module; said positioning step comprising the step off transporting said proximity card in a first direction from said reservoir to said encoding and reading station;

detecting the presence of said proximity card at said encoding and reading station;

transferring information from said database to an embedded circuit associated with said proximity card;

verifying the correct transfer of information from said database to said embedded circuit;

repositioning said proximity card in response to a failure to verify the correct transfer of information; and if said verifying step determines that the transfer of information was successful, transporting said proximity card in a second direction to said printer where said printer is between said reservoir and said first encoding and reading station.

9. The method of claim 8, wherein said repositioning step further includes the steps of:

adjusting the position of said proximity card along said transport path in said first direction;

programming embedded circuit; and verifying the correct transfer of information from said database to said embedded circuit.

10. The method of claim 9 wherein said repositioning step further includes the steps of:

if said verifying step indicates a failure to transfer said information after moving said proximity card in said first direction, adjusting the position of said proximity card along said transport path in said second direction opposite from said first direction;

programming said embedded circuit;

verifying the correct transfer of information from said database to said embedded circuit;

in response to a failure to verify, transporting said proximity card to a flipping station;

repositioning said proximity card; and repeating said positioning, programming and verifying steps.

11. The method of claim 10, further comprising the step of generating an advisory message to improve the throughput rate of said proximity cards.

12. The method of claim 8 further comprising the steps of:

moving said proximity card to said print station following a successful verification of the transfer of information from said database to said embedded circuit; and transferring printable information from said database to said printer.

13. The method of claim 8 further comprising the steps of:

positioning a proximity card at a second encoding and reading station;

operating said second encoding and reading station to detect an encoded password; and initiating operation of said computer based platform in response to a valid password.

14. A method for encoding proximity cards comprising the steps of:

loading a plurality of un-encoded proximity cards into a reservoir;

moving one of said plurality of proximity cards in a first direction from said reservoir past a print station to a proximity encoding station;

encoding said proximity card;

if said proximity card is to be printed, moving said proximity card, in a second direction opposite from said first direction, to said print station for printing;

when both encoding and printing is complete, moving said proximity cards, in said first direction, to an output bin;

if a card defect is detected during either the print or the encode process, moving said proximity card to a reject bin; and repeating the preceding steps for each of said proximity cards in said reservoir or until a printer/encoder program signals that no additional cards are to be programmed.

15. The method of claim 14 further comprising the steps of:

providing a master-encoded proximity card having encoded password information for initiating said encoding and printing steps; and placing said encoded proximity card on said proximity encoding station.

* * * * *